J. H. WYGANT.
Thill-Coupling.
No. 226,436.                    Patented April 13, 1880.
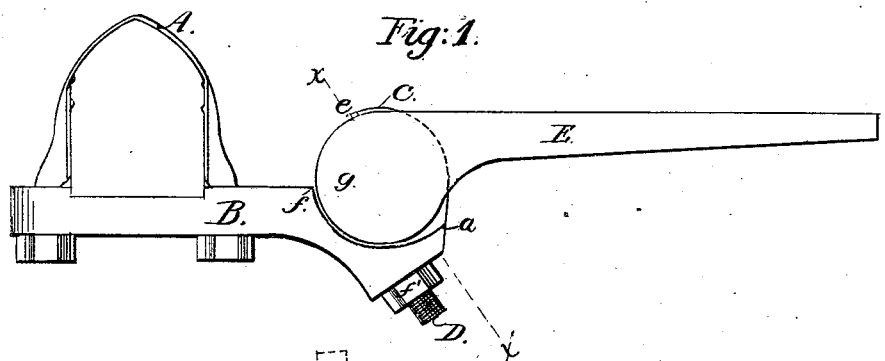
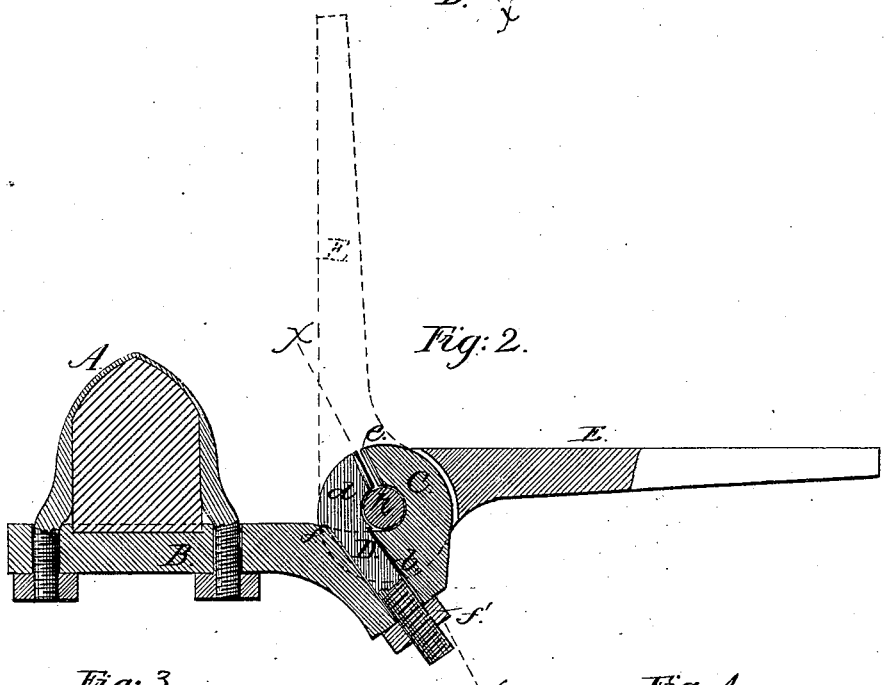
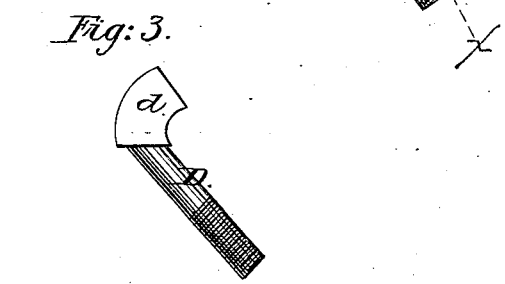
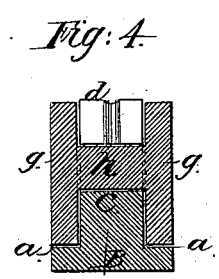
Witnesses:
John C. Tunbridge.
Willy J. E. Schultz.
Inventor:
John H. Wygant
Per A. v. Briesen,
Atty.

UNITED STATES PATENT OFFICE.

JOHN H. WYGANT, OF HACKENSACK, NEW JERSEY, ASSIGNOR OF ONE-HALF OF HIS RIGHT TO WILLIAM CRONKRIGHT, OF SAME PLACE.

THILL-COUPLING.

SPECIFICATION forming part of Letters Patent No. 226,436, dated April 13, 1880.

Application filed February 24, 1880.

*To all whom it may concern:*

Be it known that I, JOHN HENRY WYGANT, of Hackensack, in the county of Bergen and State of New Jersey, have invented a new and Improved Thill-Coupling, of which the following is a specification.

My invention consists in providing the clip-yoke with an upwardly-curved hook projecting above two shoulders, and in providing the thill-iron with jaws which are connected by a round cross-bar so arranged that the hook can enter the jaws when the thills are raised to an upright position, and when the thill is lowered the said hook engages the cross-bar of the jaws, which serves as a swivel, and prevents the thills from being disengaged from the hook.

The invention also consists of a fastening-bolt provided with a segmental head, which is adapted to be passed down between the jaws at the end of the hook, so that the head will bear against the cross-bar or swivel and prevent it from rattling.

The object of my said invention is to furnish a secure and easily-applied coupling for thills, and also to provide an arrangement for taking up the wear, and thereby prevent rattling.

In the accompanying drawings, Figure 1 represents a side elevation of my improved thill-coupling in position. Fig. 2 is a longitudinal vertical section of Fig. 1. Fig. 3 is a detailed view of the fastening-bolt which forms part of the coupling; and Fig. 4 represents a vertical cross-section of the coupling, taken on line $x$ $x$ of Figs. 1 and 2.

Referring to the drawings, A represents an axle-clip, and B the yoke of the said clip. The yoke B extends forward, and at the end of the extension is an upturned regularly-curved hook, C, projecting upward from between two concave shoulders, $a$ $a$, which are formed on the yoke B.

D is the fastening-bolt, provided with a curved and wedge-shaped head, $d$, which is the segment of a circle of the same radius as the hook C. The length of the segmental head $d$ is less than the distance from the end $e$ of the hook to the opposite portion, $f$, of the extension of the yoke B.

The object of this construction is to permit the head of the bolt to be moved in toward the center of the hook to tighten the coupling, and thereby compensate for the wear, &c.

The shank of the hook D is put through an oblique or upright hole, $b$, in plate B, and is held fast by a nut, $f'$.

E represents the thill-iron. The said iron terminates with rounded jaws $g$ $g$, which are connected by a transverse round cross-bar or swivel-pin, $h$, either passed through holes in the said jaws and riveted or otherwise fastened in place, or made in one piece with the jaws, as may be preferred. The space between the jaws $g$ $g$ is just sufficient to admit the hook C.

The parts are put together or coupled in the following manner: The hook D is first detached from the plate B. The thill-iron is raised to an upright position, as indicated by the dotted lines in Fig. 2, and the jaws placed on the shoulders $a$ $a$ behind the open end of the hook. Now, by pushing the jaws slightly forward the end $e$ of the hook passes in between the jaws and over the cross-bar $h$. By lowering the thill to a horizontal position the end of the hook passes up between the jaws, and the cross-bar $h$ is engaged by the hook in the manner shown in Fig. 2, serving now as a pivot for the thills. In this position the thill-iron cannot be disengaged from the hook either by pushing it back or raising the jaws up without turning the iron to an upright position, as the hook, by bearing on the bar $h$, prevents the jaws from being raised, and when the iron is pushed back horizontally the shoulders $a$ $a$ throw the jaws upward and the bar $h$ against the upper part of the hook, so that there is not sufficient space between the shoulders and the hook for the bar and the jaws to slip back and become disengaged from the hook.

Thus it will be seen that a secure coupling is furnished for the thills without a separate fastening device; but as an additional security, and as a means of taking up the wear, I employ the bolt D, with its segmental wedge-shaped head $d$, which bolt is passed down through the hole $b$ when the thill-iron is coupled to the hook, so that the concave portion bears against the bar $h$. The bolt is fastened in place by a nut, $f'$, whereby the head is drawn down against the bar $h$, and holds the said bar firmly in place and prevents its rattling; but as the bar wears and becomes loose it can be quickly tightened by drawing the head down against it, so as to take up the wear.

The bolt also makes it impossible to uncouple the thill from the hook. To disconnect the thills the bolt must be withdrawn, and the thills raised to an upright position, and the jaws moved backward and upward until the bar $h$ slips away from the hook.

I do not claim the combination of the plate B and hook C with thill-iron, cross-bar, and jaws, unless the plate B is made with the shoulders $a$, which materially lessen the strain on the cross-bar; nor do I claim the bolt D in its connection with the other parts, unless its head is made wedge-shaped, segmental, as and for the purpose stated.

I claim—

1. In a thill-coupling, the plate B, having the curved hook C and shoulders $a\ a$, in combination with the thill-iron having the jaws $g\ g$ and cross-bar $h$, substantially as described.

2. The bolt D, with segmental wedge-shaped head $d$, in combination with the hook C and jaws $g\ g$, connected by the cross-bar $h$, substantially as described.

JOHN H. WYGANT.

Witnesses:
 WILTON C. DONN,
 WILLY G. E. SCHULTZ.